(12) United States Patent
Morey et al.

(10) Patent No.: US 9,714,585 B2
(45) Date of Patent: Jul. 25, 2017

(54) AIRCRAFT ENGINE STAND

(71) Applicant: Westmont Industries, Whittier, CA (US)

(72) Inventors: Joel T. Morey, Placentia, CA (US); Keith Karis, Baldwin Park, CA (US)

(73) Assignee: Westmont Industries, Whitter, CA (US)

( * ) Notice: Subject to any disclaimer, the term of this patent is extended or adjusted under 35 U.S.C. 154(b) by 0 days.

(21) Appl. No.: 14/702,457

(22) Filed: May 1, 2015

(65) Prior Publication Data

US 2015/0316197 A1 Nov. 5, 2015

Related U.S. Application Data

(60) Provisional application No. 61/988,043, filed on May 2, 2014.

(51) Int. Cl.
*B62B 3/02* (2006.01)
*F01D 25/28* (2006.01)
*F16M 1/04* (2006.01)
*F16M 3/00* (2006.01)
*B62B 3/00* (2006.01)
*B62D 63/06* (2006.01)
*B64F 5/50* (2017.01)

(52) U.S. Cl.
CPC ............ *F01D 25/285* (2013.01); *B62B 3/001* (2013.01); *B62B 3/02* (2013.01); *F16M 1/04* (2013.01); *F16M 3/00* (2013.01); *B62D 63/06* (2013.01); *B64F 5/50* (2017.01); *Y02T 50/671* (2013.01)

(58) Field of Classification Search
CPC ... F16M 1/00; F16M 1/04; F16M 3/00; F01D 25/285; F01D 25/28; B62B 3/02; B62B 3/001; B62B 3/00; B62B 3/04; B62B 3/10; B62B 3/102; B64F 5/0036
USPC ........... 280/35, 47.131, 29, 638, 79.11, 79.3, 280/79.6
See application file for complete search history.

(56) References Cited

U.S. PATENT DOCUMENTS

| | | | | |
|---|---|---|---|---|
| 1,812,585 A | * | 6/1931 | Collins ................ | B25H 1/0007 248/172 |
| 2,931,519 A | * | 4/1960 | Beach .................. | B64F 5/0036 254/134 |
| 4,412,774 A | * | 11/1983 | Legrand ............... | B64F 5/0036 180/298 |
| 4,660,796 A | * | 4/1987 | Garrec .................. | B65D 85/68 108/55.1 |
| 5,383,652 A | * | 1/1995 | Van Den Berg ..... | B25H 1/0007 269/17 |

(Continued)

*Primary Examiner* — James M Dolak
(74) *Attorney, Agent, or Firm* — Sheppard, Mullin, Richter & Hampton LLP

(57) ABSTRACT

An improved aircraft engine stand is disclosed, which comprises a cradle comprising a cradle frame having first and second frame load transfer openings, first and second arm assemblies secured to the cradle frame and having first and second arm load transfer openings, and first and second load transfer pins shaped to be received in the load transfer openings. The frame load transfer openings can be aligned with the arm load transfer openings such that when the each load transfer pin is inserted into both a frame load transfer opening and an arm load transfer opening, lateral and axial loads placed on the arm assembly are transferred to the cradle frame.

17 Claims, 17 Drawing Sheets

(56) References Cited

U.S. PATENT DOCUMENTS

| | | | |
|---|---|---|---|
| 5,575,607 A * | 11/1996 | Grout | B66C 19/00 |
| | | | 212/344 |
| 5,644,992 A | 7/1997 | Clive-Smith | |
| 5,653,351 A * | 8/1997 | Grout | B66C 19/00 |
| | | | 212/315 |
| 5,816,367 A * | 10/1998 | Lilja | B64F 5/0036 |
| | | | 187/244 |
| 6,170,141 B1 | 1/2001 | Rossway et al. | |
| 7,021,461 B1 | 4/2006 | Robey | |
| 7,103,952 B2 * | 9/2006 | Appleton | F01D 25/285 |
| | | | 244/54 |
| 7,770,292 B2 * | 8/2010 | Stretton | B64F 5/0036 |
| | | | 269/17 |
| 7,810,799 B2 | 10/2010 | McGloghlon | |
| 8,057,140 B2 * | 11/2011 | Entwistle | B64F 5/0036 |
| | | | 410/47 |
| 8,262,050 B2 * | 9/2012 | Linz | B64F 5/0036 |
| | | | 244/54 |
| 8,360,252 B1 | 1/2013 | Fagan | |
| 8,602,713 B1 * | 12/2013 | Davis | B60P 1/025 |
| | | | 254/10 C |
| 9,022,370 B2 * | 5/2015 | Swan | B64F 5/0036 |
| | | | 269/37 |
| 9,388,709 B2 * | 7/2016 | Edwards | F01D 25/285 |
| 9,394,829 B2 * | 7/2016 | Cabeen | F01D 25/28 |
| 9,470,108 B2 * | 10/2016 | Jacobs | F01D 25/285 |
| 9,470,109 B2 * | 10/2016 | Choi | F01D 25/285 |
| 9,518,533 B2 * | 12/2016 | Holay | F01D 25/285 |
| 2007/0017881 A1 | 1/2007 | Aiken | |

* cited by examiner

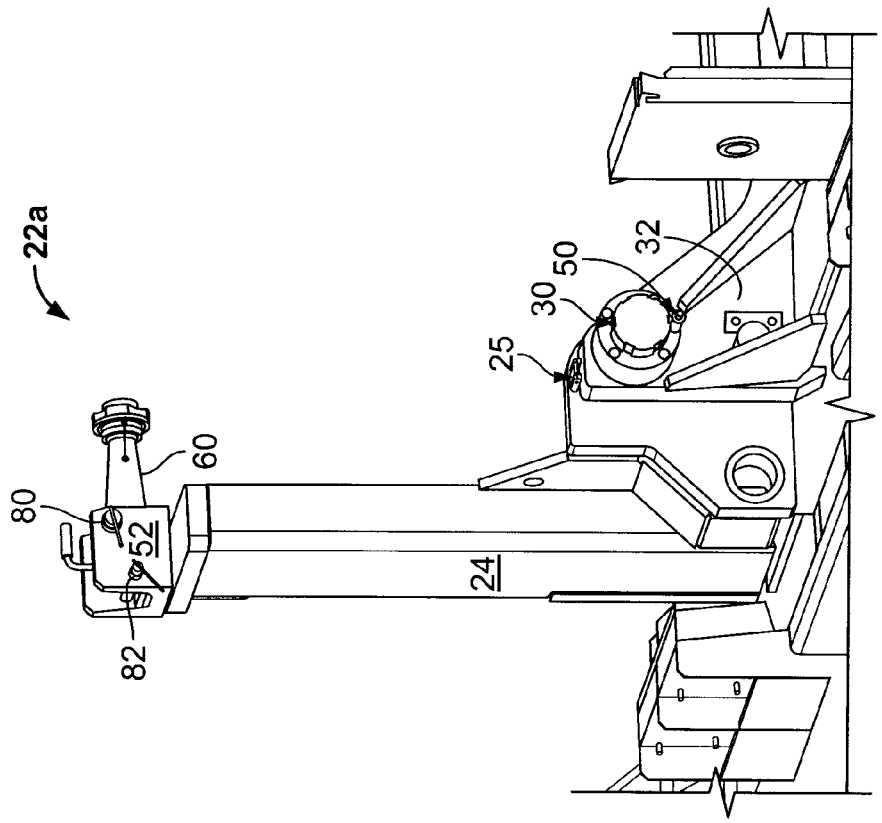
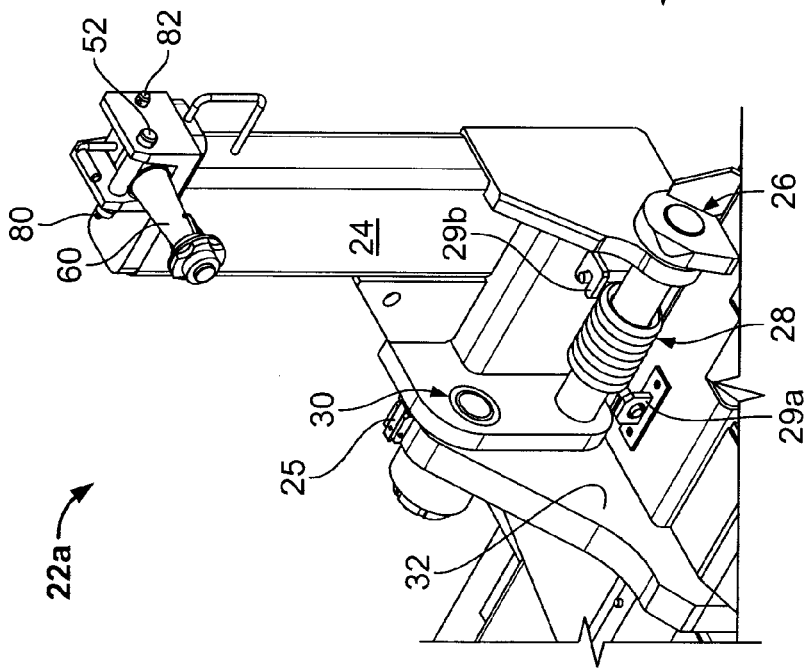
FIG. 6A
FIG. 6B

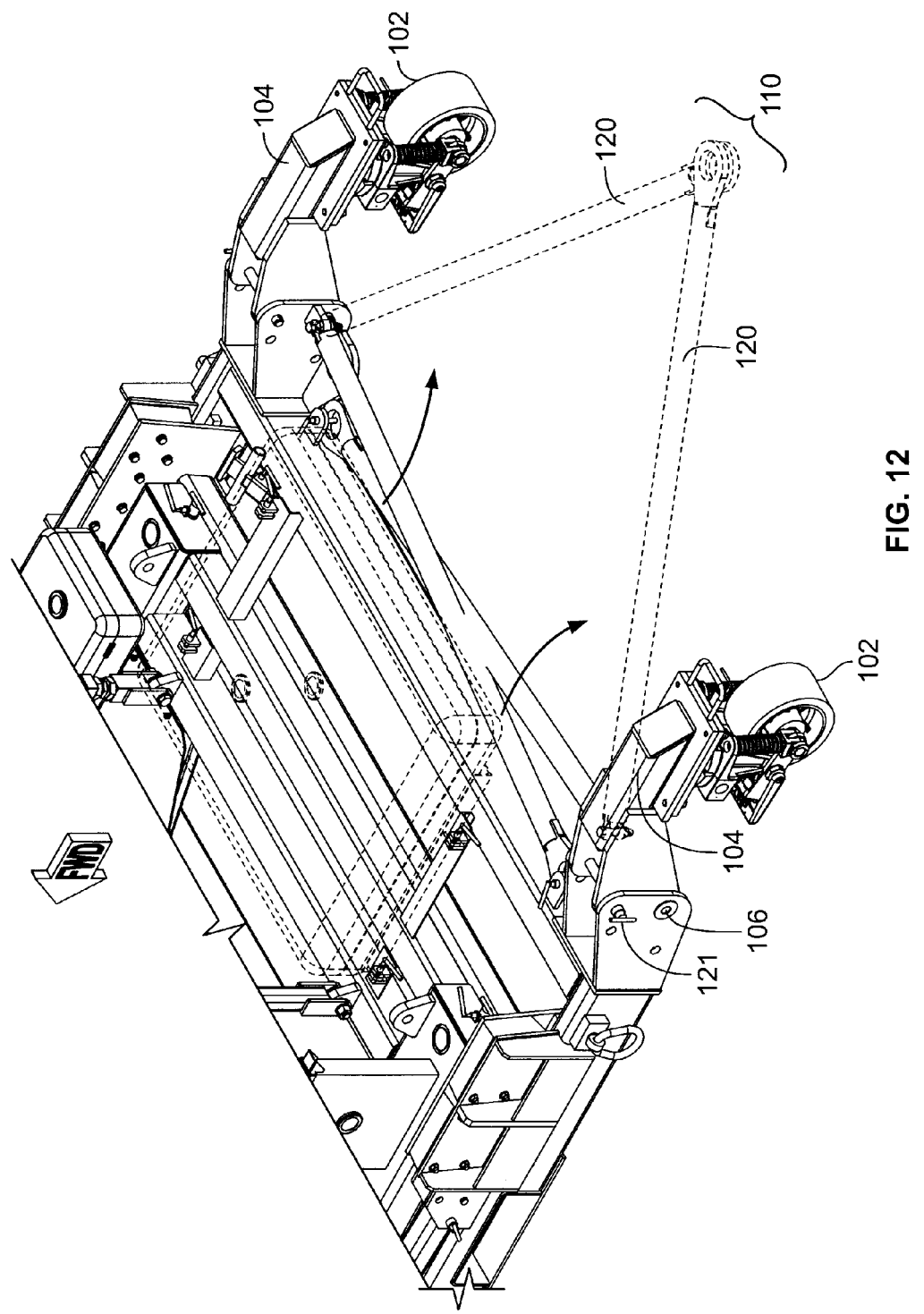

AIRCRAFT ENGINE STAND

CROSS-REFERENCE TO RELATED APPLICATION

The present application claims priority to U.S. Provisional Application No. 61/988,043, entitled "Aircraft Engine Stand," filed on May 2, 2014, the entire contents of which are herein incorporated by reference as if fully set forth herein.

BACKGROUND OF THE INVENTION

The present invention relates generally to an improved aircraft engine stand.

Aircraft engine manufacturer requirements generally require that all axial and lateral loads placed on an aircraft engine be exerted on the front of the engine. As such, aircraft engine stands generally must be designed to shift all axial and lateral loads to the front of the engine.

In existing aircraft engine stands, this is achieved through the use of a diagonal brace that extends downward and rearward from the top of the stand arms, connecting to the stand's base. While this diagonal brace achieves the goal of transferring axial and lateral loads to the front of the engine, the brace is large, intrusive, and cumbersome, and often must be removed during installation or removal of an aircraft engine and then re-installed once the engine is installed.

It can readily be appreciated that there is a need for an improved aircraft engine stand that removes unnecessary parts and reduces unnecessary labor, while still effectively meeting aircraft engine manufacturer requirements regarding axial and lateral loads. The present invention fulfills these needs and provides further related advantages.

SUMMARY OF THE INVENTION

The stand disclosed herein satisfies the requirement of shifting axial and lateral loads to the front of the engine, while eliminating the diagonal brace. By eliminating the large, heavy brace, the weight of the stand may be decreased, and material costs may be reduced. Further, elimination of the brace makes the stand easier to use by making it easier to remove or install an engine and increasing access to the engine. In place of the diagonal brace, the disclosed engine stand, in one embodiment, transmits lateral and axial loads via a large diameter pin and a pivot shaft which connect the engine support arms to a load restraint structure, as will be discussed in greater detail below.

The present invention may be embodied in an aircraft engine stand comprising a cradle and first and second load transfer pins. The cradle may comprise a cradle frame having a first frame load transfer opening and a second frame load transfer opening, a first arm assembly secured to the cradle frame and having a first arm load transfer opening, and a second arm assembly secured to the cradle frame and having a second arm load transfer opening. The first load transfer pin may be shaped to be received in the first load transfer opening and the first arm load transfer opening, and the second load transfer pin may be shaped to be received in the second frame load transfer opening and the second arm load transfer opening. The first frame load transfer opening may be aligned with the first arm load transfer opening to receive the first load transfer pin, and the second frame load transfer opening may be aligned with the second arm load transfer opening to receive the second load transfer pin.

In a preferred embodiment, the first arm assembly and the second arm assembly may be pivotably secured to the cradle frame. In a further aspect, the cradle frame my define a plane and the first and second arm assemblies may be pivotable between a stowed configuration in which the first and second arm assemblies extend substantially parallel to the plane of the cradle frame, and an upright configuration in which the first and second arm assemblies extend substantially perpendicular to the plane of the cradle frame. The first arm load transfer opening may align with the first frame load transfer opening when the first arm assembly is in the upright configuration, and the second arm load transfer opening may align with the second frame load transfer opening when the second arm assembly is in the upright configuration.

In another aspect, the cradle may further comprise a first torsion spring secured to the cradle frame for at least partially counterbalancing the first arm assembly, and a second torsion spring secured to the cradle frame for at least partially counterbalancing the second arm assembly. In a further aspect, the rotation of each of the first and second arm assemblies may require less than about 75 pounds of force, or in a further preferred aspect, less than about 50 pounds of force.

The first and second arm assemblies may each be pivotable to an outboard position in which the arm assemblies are rotated beyond the upright configuration (i.e., beyond perpendicular) to provide additional clearance during engine installation.

In a further aspect of this embodiment, the first arm assembly may further comprise a first mount retaining saddle having a first retainer pin, and the second arm assembly may further comprise a second mount retaining saddle having a second retainer pin. The aircraft engine stand may further comprise first and second engine mount shafts configured to be mounted in the first and second mount retaining saddles, respectively. Each of the first and second engine mount shafts may comprise an interior end configured to be inserted into an aircraft engine, an exterior step positioned along a top surface of the first engine mount shaft opposite the interior end, the exterior step configured to engage the retainer pin in the mount retaining saddle, and a curved chamfer positioned along a bottom surface of the engine mount shaft directly beneath the exterior step. The curved chamfer may be configured to allow the engine mount shaft to rotate about the retainer pin within the mount retaining saddle.

In another aspect of this embodiment, the aircraft engine stand may further comprise a transport base configured to receive the cradle, the transport base comprising a base frame and a plurality of caster assemblies pivotably secured to the base frame such that each of the plurality of caster assemblies may be pivoted between a stowed configuration and an active configuration. In a further aspect, the aircraft engine stand may have a stowed configuration in which the first arm assembly, the second arm assembly and the plurality of caster assemblies are in their respective stowed configurations. When the aircraft engine stand is placed in the stowed configuration, it may be stackable with other similarly configured aircraft engine stands.

The present invention may also be embodied in an engine mount shaft comprising an interior end configured to be inserted into an aircraft engine; an exterior step positioned along a top surface of the engine mount shaft opposite the interior end, the exterior step configured to engage a retainer pin in a mount retaining saddle; and a curved chamfer positioned along a bottom surface of the engine mount shaft directly beneath the exterior step, the curved chamfer configured to allow the engine mount shaft to rotate about the retainer pin within the mount retaining saddle. The engine mount shaft may further comprise an adjusting nut for adjusting the length of the engine mount shaft.

In another embodiment, an aircraft engine stand may comprise a cradle, a first engine mount shaft, a second engine mount shaft, a first load transfer pin, and a second load transfer pin. The cradle may comprise a cradle frame defining a plane and having a first frame load transfer opening and a second frame load transfer opening; a first arm assembly, having a first arm load transfer opening; a second arm assembly, having a second arm load transfer opening; a first mount retaining saddle positioned on the first arm assembly, and a second mount retaining saddle positioned on the second arm assembly. The first and second arm assemblies may each be pivotable between a stowed configuration in which the first and second arm assemblies extend substantially parallel to the plane of the cradle frame, and an upright configuration in which the first and second arm assemblies extend substantially perpendicular to the plane of the cradle frame. The first engine mount shaft may be configured to be mounted in the first mount retaining saddle, and the second engine mount shaft may be configured to be mounted in the second mount retaining saddle. The first load transfer pin may be shaped to be received in the first load transfer opening and the first arm load transfer opening, and the second load transfer pin may be shaped to be received in the second frame load transfer opening and the second arm load transfer opening. The first frame load transfer opening may be aligned with the first arm load transfer opening to receive the first load transfer pin when the first arm assembly is in the upright configuration, and the second frame load transfer opening may be aligned with the second arm load transfer opening to receive the second load transfer pin when the second arm assembly is in the upright configuration.

In one aspect of this embodiment, the cradle my further comprise a first torsion spring secured to the cradle frame for at least partially counterbalancing the first arm assembly, and a second torsion spring secured to the cradle frame for at least partially counterbalancing the second arm assembly. In a further aspect, the rotation of each of the first and second arm assemblies may require less than about 75 pounds of force, or in a further preferred aspect, less than about 50 pounds of force.

In another aspect of this embodiment, the aircraft engine stand may further comprise a transport base configured to receive the cradle, the transport base comprising a base frame and a plurality of caster assemblies pivotably secured to the base frame such that each of the plurality of caster assemblies may be pivoted between a stowed configuration and an active configuration. In a further aspect, the aircraft engine stand may have a stowed configuration in which the first arm assembly, the second arm assembly and the plurality of caster assemblies are in their respective stowed configurations. When the aircraft engine stand is placed in the stowed configuration, it may be stackable with other similarly configured aircraft engine stands.

These and other features and advantages of the invention should become more readily apparent from the detailed description of the preferred embodiments set forth below taken in conjunction with the accompanying drawings, which illustrate, by way of example, the principles of the invention.

BRIEF DESCRIPTION OF THE DRAWINGS

Embodiments of the present disclosure will now be described, by way of example only, with reference to the following drawings.

FIGS. 6A and 6B provide front and rear views, respectively, of an arm assembly in accordance with an embodiment of the present invention.

FIG. 12 provides a close-up view of a tow bar assembly in accordance with an aspect of an embodiment of the present invention.

DESCRIPTION OF THE INVENTION

The present invention provides an improved aircraft engine stand for safely supporting and transporting an aircraft engine, while increasing safety and ease of use and reducing material costs, among other related advantages.

Figure 1A:
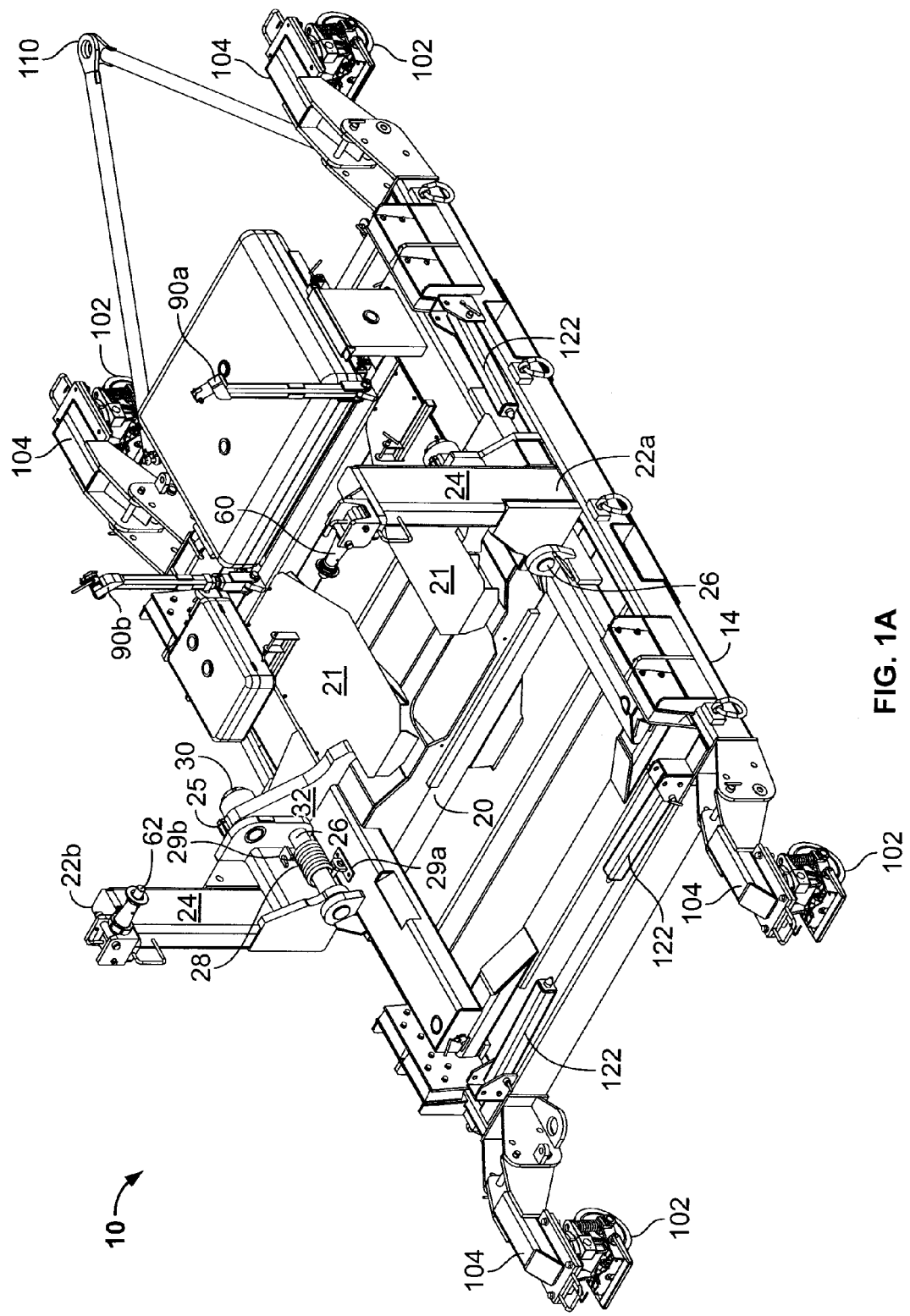
FIG. 1A provides a front perspective view of an aircraft engine stand, in accordance with an embodiment of the present invention.

Referring now to the drawings, and particularly to FIG. 1A thereof, there is shown a perspective view of an aircraft engine stand 10, in accordance with an exemplary embodiment of the present invention. As is more clearly demonstrated in FIG. 3, the aircraft engine stand 10 comprises a cradle 12 and a transport base 14.

Figure 1B:
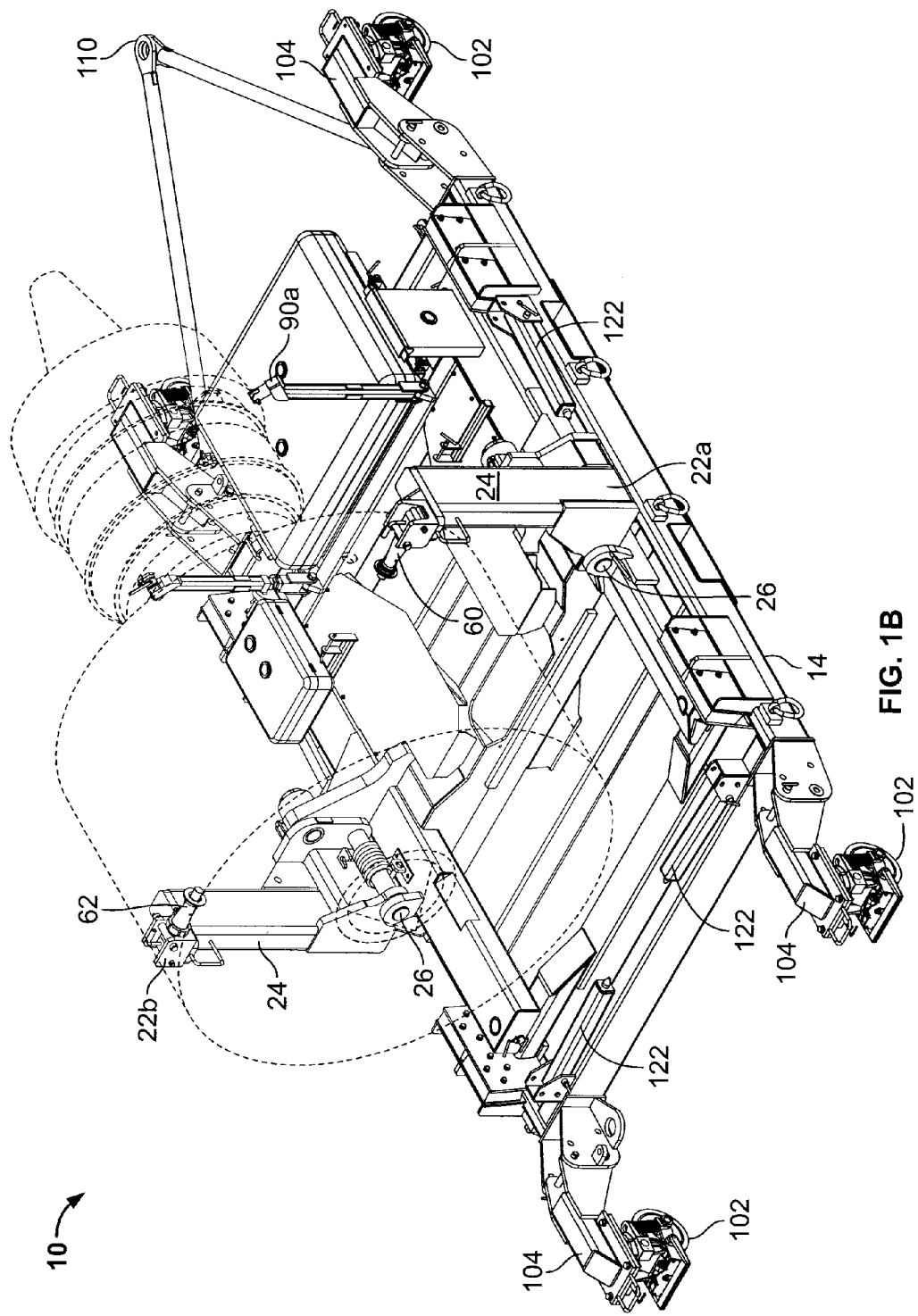
FIG. 1B provides a front perspective view of the aircraft engine stand of FIG. 1A with an aircraft engine installed.
Figure 2:
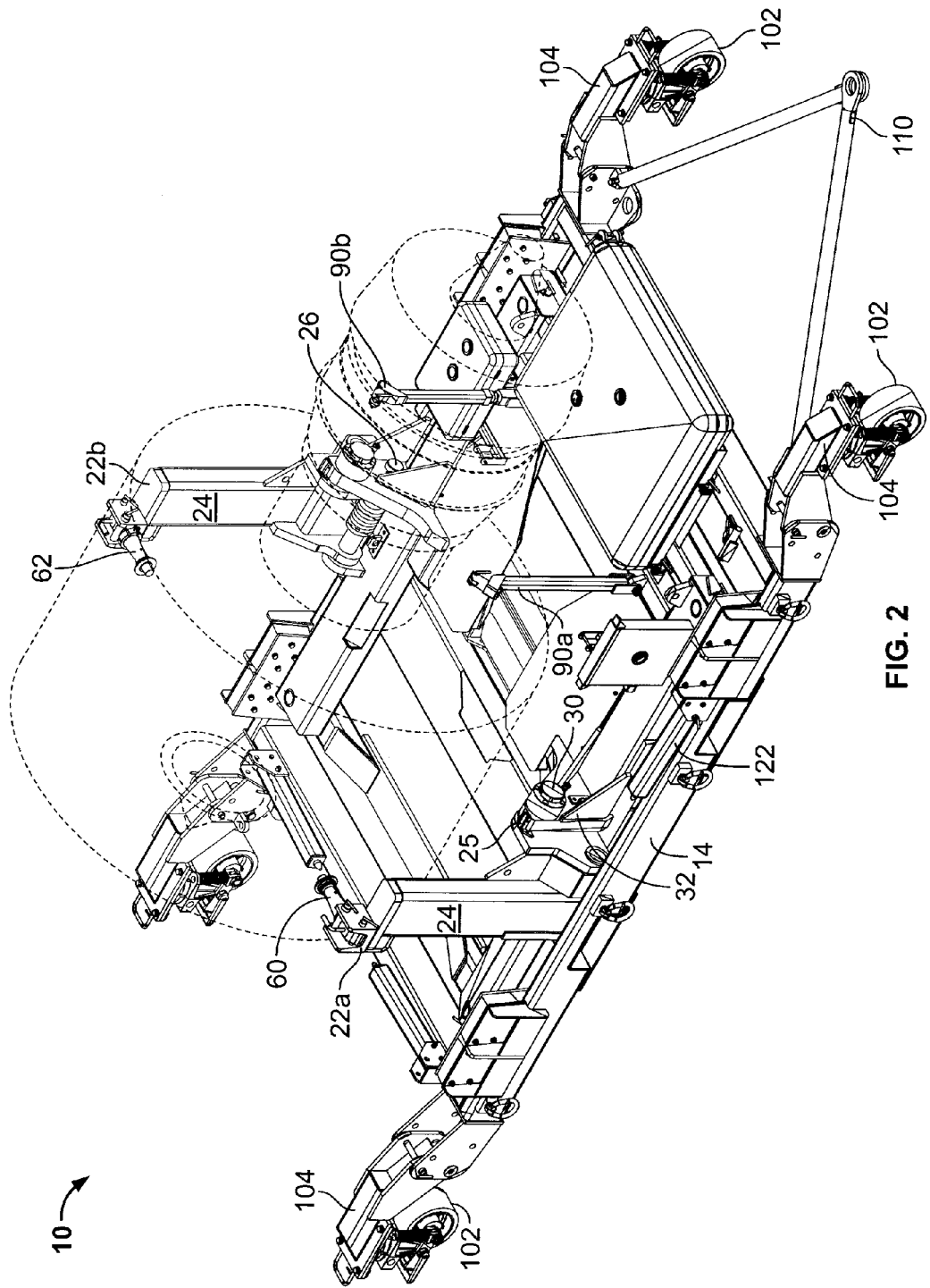
FIG. 2 provides a rear perspective view of the aircraft engine stand of FIG. 1A with an aircraft engine installed.

The cradle 12 is configured to receive and support an aircraft engine. FIG. 1B provides a front perspective view of the stand 10 with an aircraft engine installed in the cradle 12, while FIG. 2 provides a rear perspective view of the stand 10 with an aircraft engine installed. The transport base 14 is configured to receive and support the cradle 12, and allow for transport of the cradle 12, with or without an engine installed.

Figure 3:
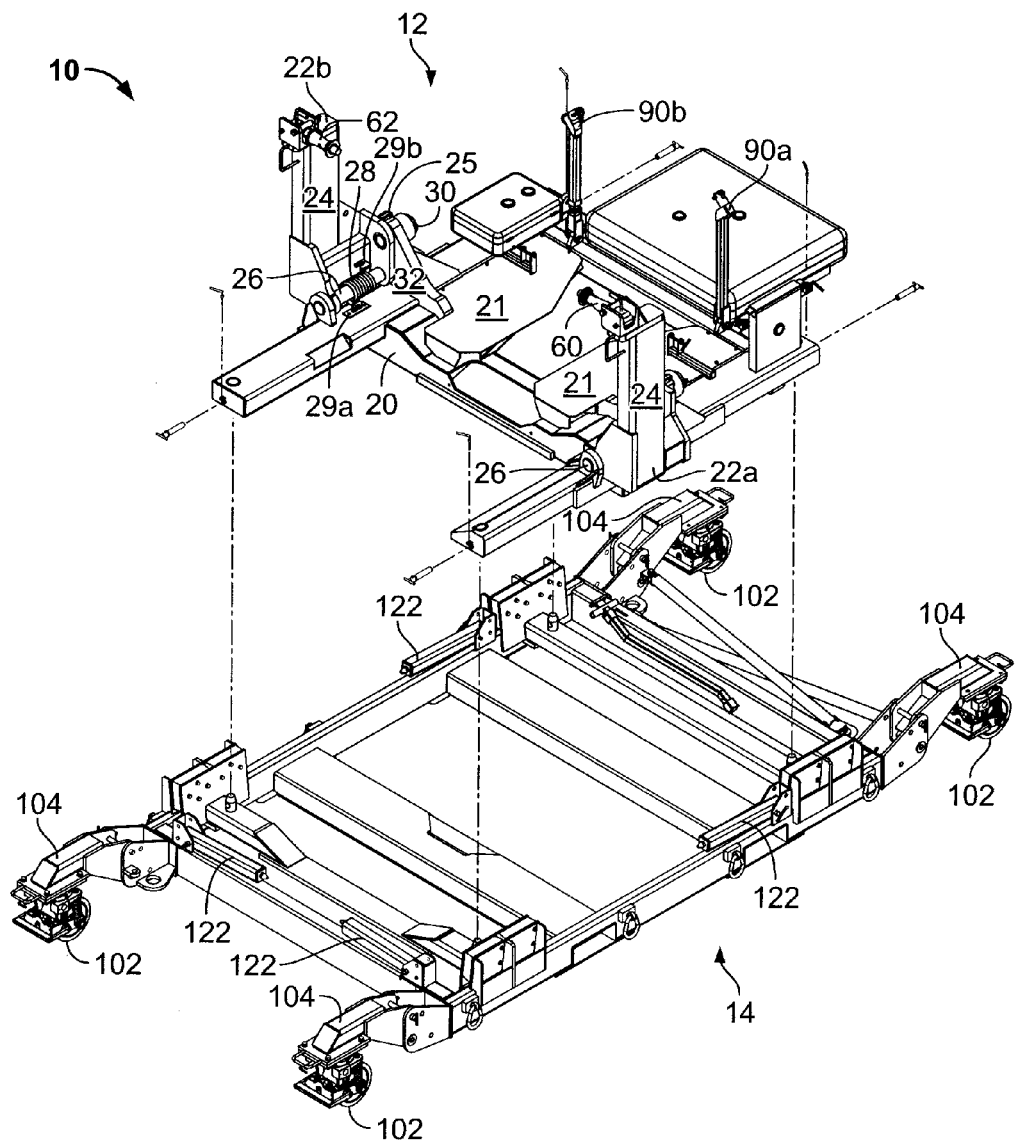
FIG. 3 provides a perspective view an aircraft engine cradle and a transport base, in accordance with an embodiment of the present invention.
Figure 4:
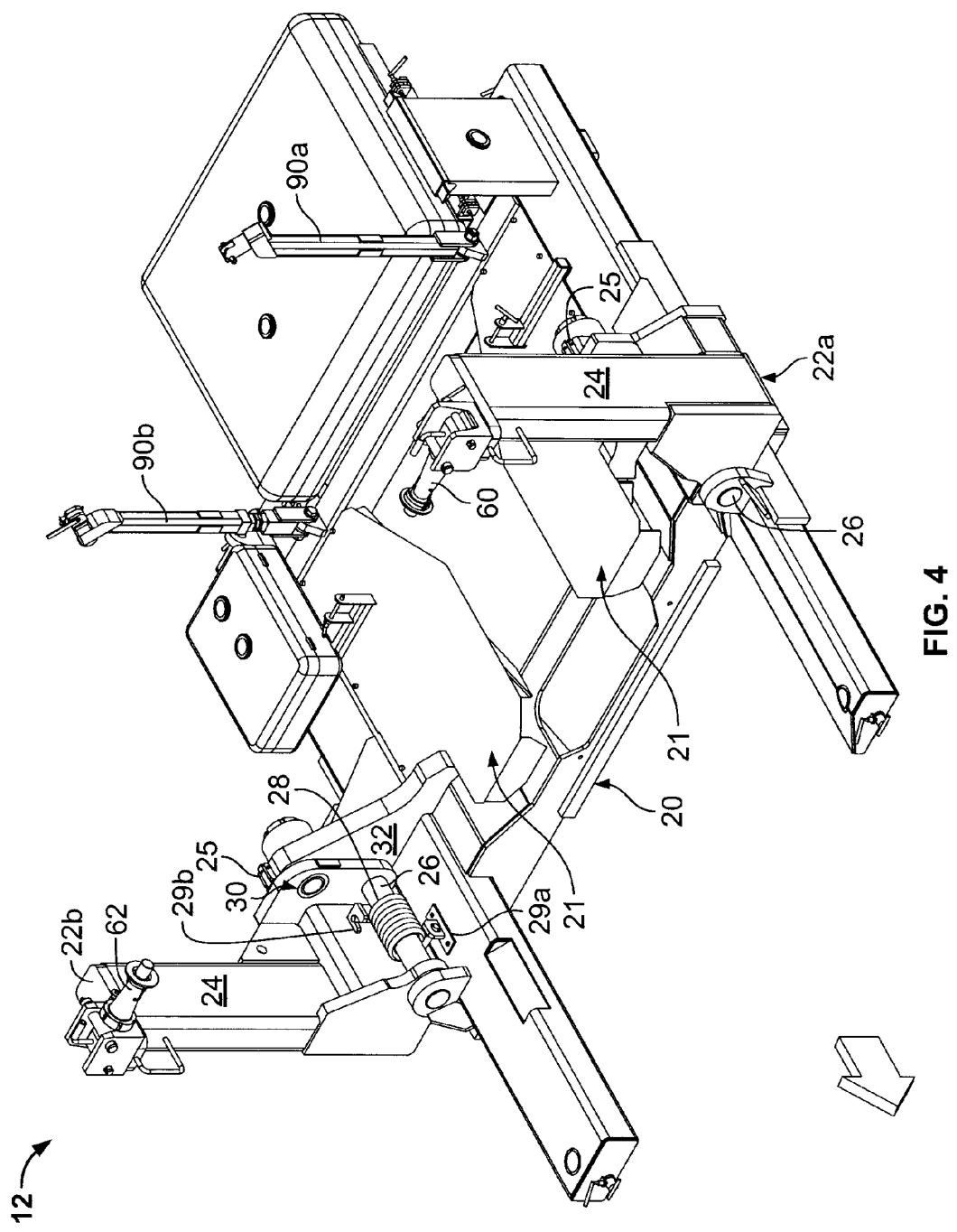
FIG. 4 provides a perspective view of an aircraft engine cradle, in accordance with an embodiment of the present invention.
Figure 5:
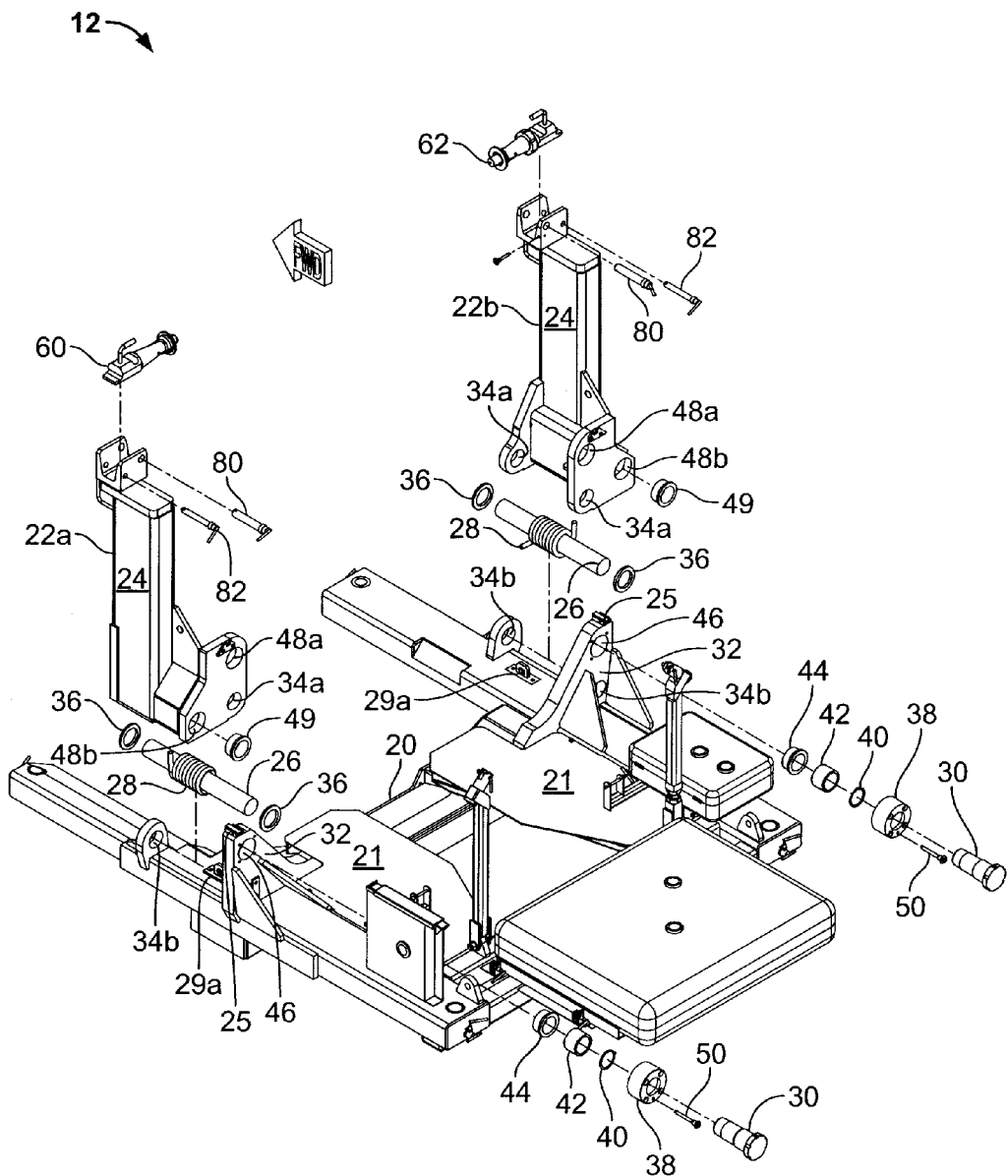
FIG. 5 provides an exploded view of an aircraft engine cradle, in accordance with an embodiment of the present invention.

FIG. 4 provides a perspective view of the cradle 12, and FIG. 5 provides an exploded view. The cradle 12 comprises a cradle frame 20 having one or more platforms 21 and two arm assemblies: a left arm assembly 22a, and a right arm assembly 22b, which are mirror images of each other. FIGS. 6A and 6B provide close-up views of the left arm assembly 22a. Each arm assembly 22a, 22b comprises a support arm 24 that is rotatably mounted to the cradle frame 20 via a pivot shaft 26. The pivot shaft 26 is inserted through openings 34a in the support arm 24 and corresponding openings 34b in the cradle frame 20, thereby securing the support arm 24 to the cradle frame 20 (shown most clearly in FIG. 5). Washers 36 are positioned on either end of the pivot shaft 26. The pivot shaft 26 allows the support arm 24 to pivot from a stowed position, in which the support arm 24 is folded inwardly and lies parallel to the cradle frame 20, to an upright position, in which the support arm 24 is perpendicular to the cradle frame 20 (as shown in FIGS. 1-3). The support arm 24 may also be permitted to pivot slightly beyond perpendicular, into an outwardly extending position. In this way, the support arms may pivot inwards so as to conserve space for stacking or storing of unused stands, and may also pivot outwards to make it easier to install or remove an engine.

The support arms can be heavy, weighing upwards of 350 lbs., creating the risk of injury when the arms are rotated in or out. As such, the support arm 24 is biased by a torsion spring 28 surrounding the pivot shaft 26 to help counterbalance the weight of the arm for both outboard and inboard rotation of the arm. One end of the torsion spring 28 is secured to a spring bracket 29a on the cradle frame 20, and the other end of the torsion spring 28 is secured to a spring bracket 29b on the support arm 24. By providing such support, the torsion spring 28 makes rotation of the support arm 24 easier while also improving worker safety by limiting the weight and acceleration of the support arms 24 as they are rotated. In a more particular embodiment, the torsion spring may reduce the lifting load of the support arm to less than 75 lbs., and in an even more particular embodiment, to less than 50 lbs. A safety latch 25 holds the arm in place while the load transfer pin 30 is retracted, which prevents injuries resulting from unintended rotation of the arm when the pin 30 is retracted. The safety latch 25 is such that it can be released only after the load of the arm 24 is manually removed.

In either the stowed or the upright position, the support arm 24 is further connected to the cradle frame 20 via a load transfer pin 30. The load transfer pin 30 slides into the support arm 24 when the support arm 24 is upright or stowed, and can slide out to provide clearance for the support arm 24 to rotate. The load transfer pin 30 is inserted through a tapered pin housing 38, a retaining ring 40, a straight bushing 42, and a tapered bushing 44 into a load transfer opening 46 in a load-bearing plate 32 that is part of the cradle frame 20. Through the opening 46, the load transfer pin 30 is inserted into corresponding load transfer openings 48a, 48b in the support arm 24. When the support arm 24 is upright, a first opening 48a in the support arm 24 aligns with the opening 46 in the load-bearing plate 32, allowing for the load transfer pin 30 to be inserted. When the support arm 24 is stowed, a second opening 48b in the support arm 24 aligns with the opening 46 in the load-bearing plate 32, once again allowing for the load transfer pin 30 to be inserted. The load transfer pin 30 is secured in place using a ball lock pin 50. Both lateral and axial loads placed on the support arm 24 are transferred to and shared by the cradle frame 20 via the load transfer pin 30 and the load-bearing plate 32. Unique features of this design, such as the robust size of the load transfer pin, allow the use of a single connecting pin in single shear in lieu of multiple pins or a very long double shear, which are difficult to install in precisely fitting components. The tapered shape and threaded portion of the load transfer pin allow it to be inserted very tightly into the tapered bushing providing a very rigid connection between the cradle frame and the support arm free of play.

Prior art aircraft engine stands have used a diagonal brace connecting the support arm 24 to the cradle frame 20 to transfer axial and lateral loads from the arm to the frame. However, as discussed above, these diagonal arms are large, heavy, and cumbersome. Further, these heavy diagonal arms would have to be removed before, and re-installed after, engine installation. In one embodiment of the present invention, the function of axial and lateral load transfer is performed by the load transfer pin 30 and the load-bearing plate 32. By eliminating the diagonal brace, this embodiment removes unnecessary weight, decreases material costs, increases engine access and ease of use, and also eliminates a potentially dangerous step in engine installation.

Figure 7A:
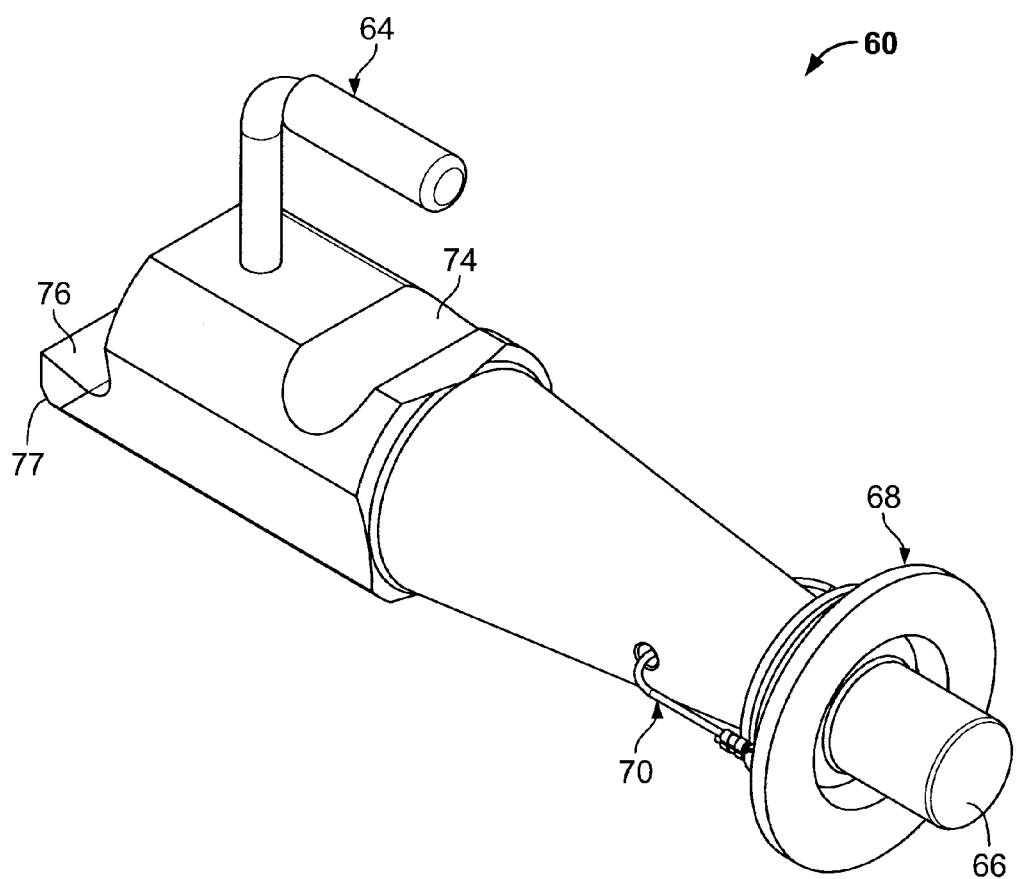
FIG. 7A provides a perspective view of a fixed engine mount in accordance with an aspect of an embodiment of the present invention.
Figure 7B:
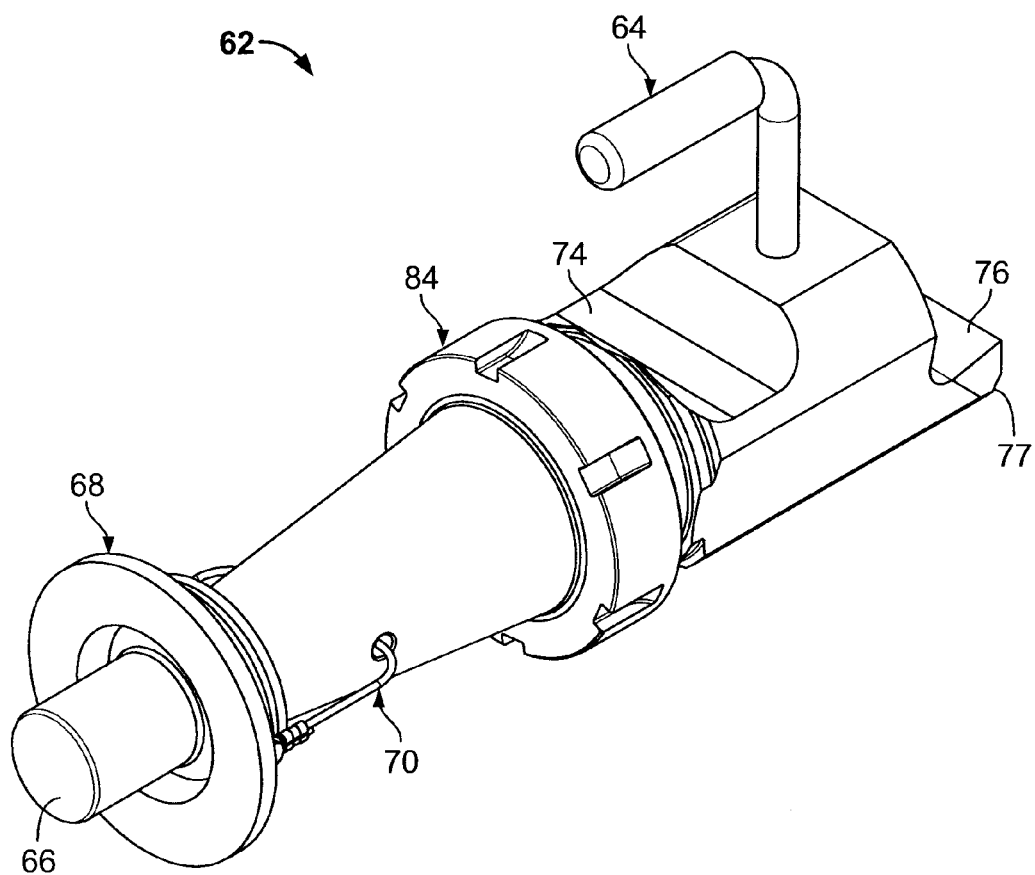
FIG. 7B provides a perspective view of an adjustable engine mount in accordance with an aspect of an embodiment of the present invention.
Figure 8B:
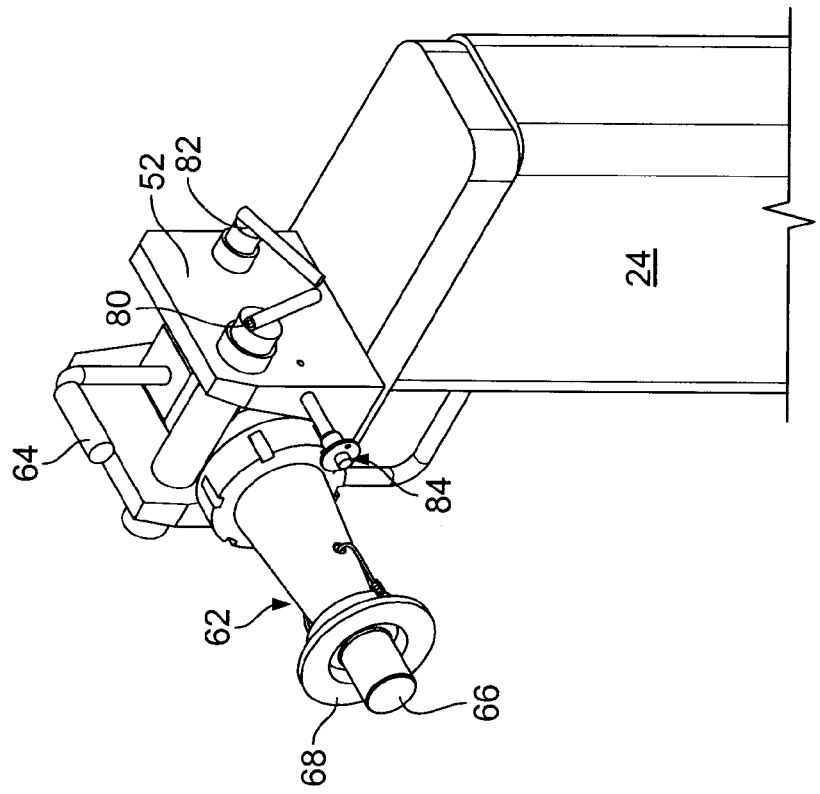
FIG. 8B provides a perspective view of the adjustable engine mount of FIG. 7B mounted on an arm assembly.
Figure 8A:
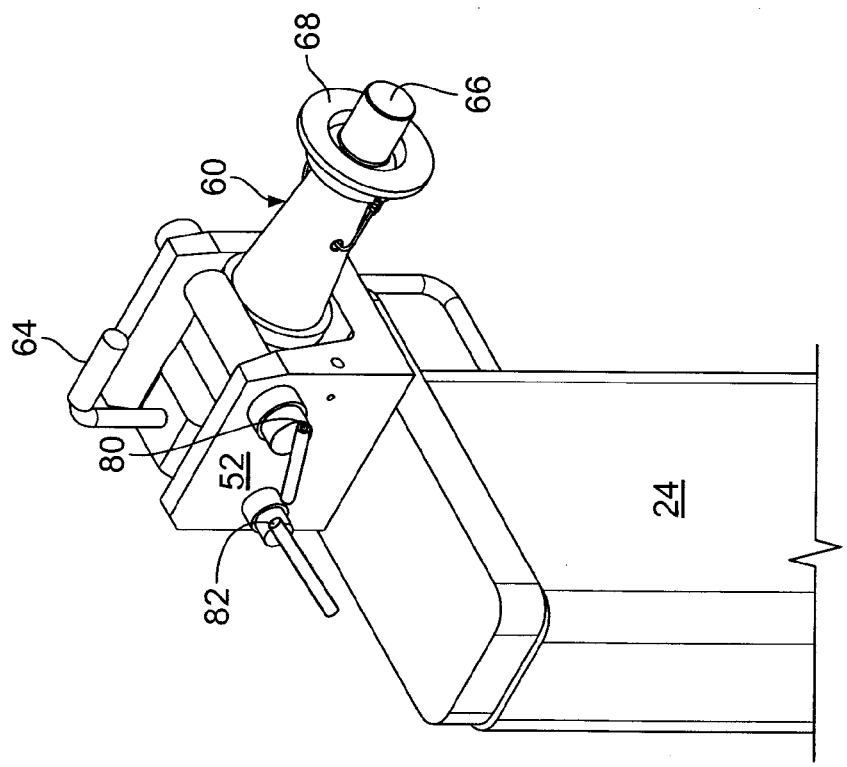
FIG. 8A provides a perspective view of the fixed engine mount of FIG. 7A mounted on an arm assembly.

At the top of each support arm 24 is a mount retaining saddle 52 for receiving and securing engine mount shafts 60, 62. In the depicted embodiment, the left hand mount shaft 60 is a fixed mount shaft, and the right engine mount shaft 62 is an adjustable mount shaft. FIG. 7A provides a close-up view of the left hand fixed mount shaft 60, while FIG. 7B provides a close-up view of the right hand adjustable mount shaft 62. FIGS. 8A and 8B provide close-up views of the mount shafts 60, 62 installed into the saddles 52 on the arm assemblies 22a, 22b. Each mount shaft 60, 62 has a handle 64, an insert end 66 to be inserted into the aircraft engine, a bearing plate 68, and a lanyard 70 secured to the bearing plate 68. The lanyard 70 retains the bearing plate 68 to the mount shaft 60, 62 while allowing a certain amount of rotation between the two parts about a spherical mating surface.

Along the rear portion of each mount shaft 60, 62 is an exterior step 76 and chamfer 77. Each mount shaft 60, 62 also has an interior groove 74. As seen in FIGS. 8A and 8B, the exterior step 76 aligns with an outboard retainer pin 82 while the interior groove 74 aligns with an inboard retainer pin 80 to secure the engine mounts 60, 62 within the saddles 52. The exterior step 76 and chamfer 77 eases engine installation and enhances user safety by permitting the mount shaft 60, 62 to slide into the mount retaining saddle 52 with minimal guidance by a user. As the engine is lowered, the exterior step 76 engages the outboard retaining pin 82. As the engine is further lowered, the curved, smooth surface of the chamfer 77 allows the mount shaft 60, 62 to slightly rotate about the outboard retainer pin 82 to slide easily into place. Once the mount shaft 60, 62 is fully positioned within the saddle 52, the inboard retainer pin 80 is inserted into the saddle 52, engaging the interior groove 74, and locking the mount shaft 60, 62 into place within the saddle.

The adjustable adapter 62 is differentiated from the fixed adapter 60 in that the adjustable adapter 62 has an adjusting nut 84. The adjusting nut allows a user to adjust the position of the adapter by rotating the adjusting nut clockwise or counterclockwise ensuring proper fit to the aircraft engine. As will be discussed in greater detail below, each engine mount 60, 62, is inserted into the aircraft engine to be mounted on the cradle 12. The engine is then carefully lowered onto the cradle 12 such that the engine mounts 60, 62 rest within the mount-retaining saddles 52 on each arm assembly 22a, 22b. Retainer pins 80, 82 are then inserted into openings in the mount-retaining saddles 52 and engage the grooves 74, 76 on each mount 60, 62, locking the mount into place and securing the front portion of the aircraft engine to the arm assemblies 22a, 22b.

Figure 9:
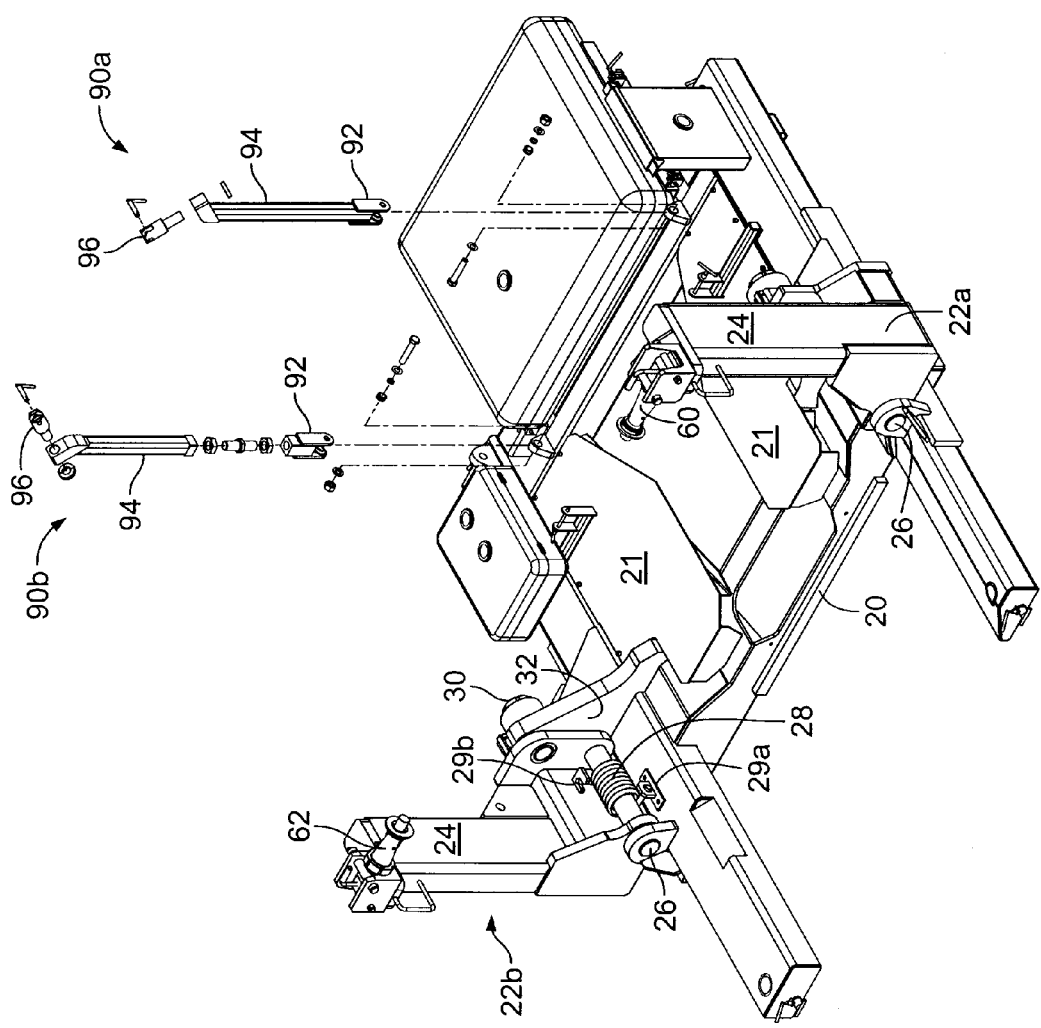
FIG. 9 provides an exploded view of the aft portion of an aircraft engine cradle, in accordance with an embodiment of the present invention.

In addition to the arm assemblies 22a, 22b, which secure and support the front portion of the aircraft engine, two aft supports 90a, 90b support the aft portion of the aircraft engine. FIG. 9 provides an exploded view of the aft supports 90a, 90b. Each aft support 54a, 54b has a base 92, an arm 94, and a trunnion 96. Like the arm assemblies 22a, 22b, each base 92 is pivotably attached to the cradle frame 20 so as to be collapsible into a stowed position. The trunnions 96 are securable to the aft portion of the aircraft engine via pins 98.

Figure 10:
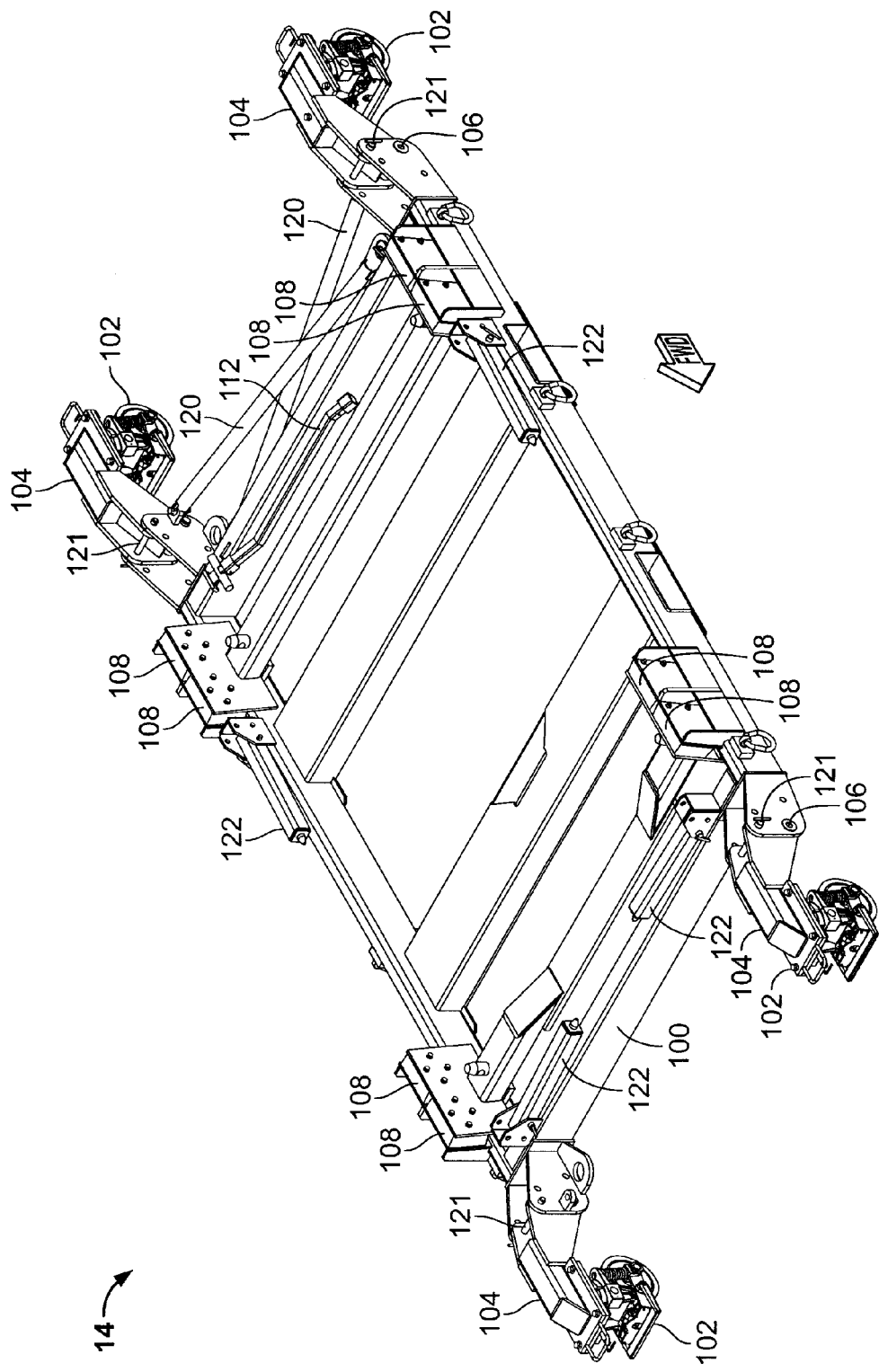
FIG. 10 provides a perspective view of an aircraft engine stand transport base in accordance with an embodiment of the present invention.

FIG. 10 provides a perspective view of a transport base 14, as previously shown in FIGS. 1-3. The transport base 14 comprises a base frame 100 and four caster assemblies 102 pivotably mounted to the base frame via caster supports 104 and pivot pins 106. Adjacent to each caster assembly 102 is a shock mount isolator 108. The shock mount isolators 108 provide shock and vibration protection to the aircraft engine when the stand is fully assembled. The transport base 14 also has four pivotably attached stacking legs 122 for stacking engine stands (discussed in greater detail with respect to FIG. 15). The transport base 14 further comprises a tow assembly 110 and a steering bar 112 for towing and steering the transport base 14, respectively.

Figure 11:
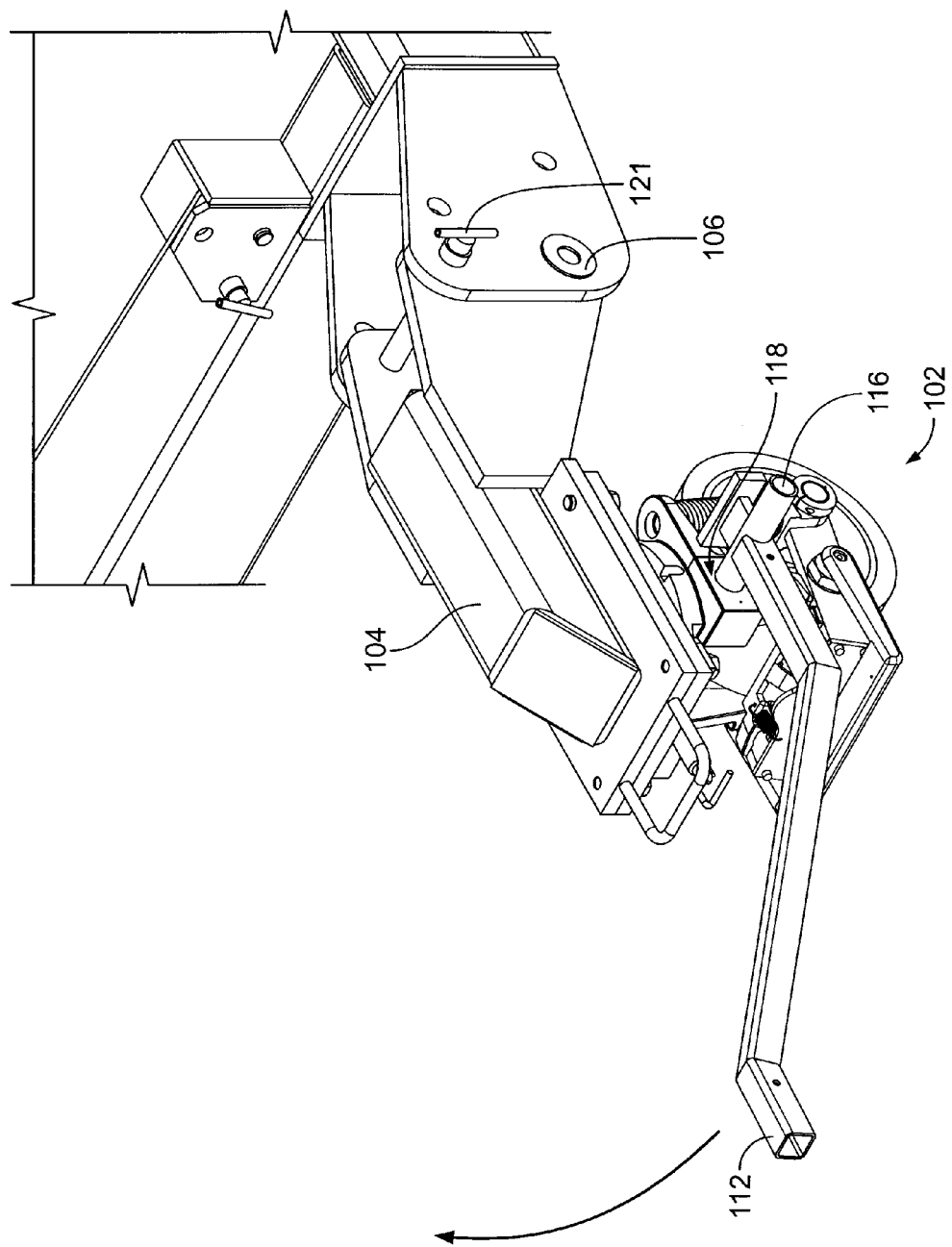
FIG. 11 provides a close-up view of a caster assembly with a steering bar in accordance with an aspect of an embodiment of the present invention.

FIG. 11 provides a close-up view of a caster assembly 102 with the steering bar 112 installed. The steering bar 112 has a handle end 114 and a T-shaped end 116. As can be seen in the figure, the T-shaped end 116 can be inserted into a steering socket 118 in the caster assembly 102. Pushing or pulling the steering bar 112 turns the caster to allow the transport base 14 to be moved in the desired direction. The caster assembly 102 is bolted to a caster support 104 which is then attached to the base frame with a pivot pin 106 and a safety pin 121. Each caster support 104 can pivot vertically about the pivot pin 106, allowing the caster assembly to be stowed and further allowing the base frame to rest flat on a truck bed or aircraft pallet during transportation. Safety pin 121 is removed to allow the caster support 104 to be pivoted upward to of of two stowage positions where the safety pin is then reinserted to secure the caster assembly. The steering bar 112 can be used when pivoting the caster up or down, reducing the effort required of a user. The caster assembly 102 has a four-position swivel lock and a foot operated brake.

FIG. 12 provides a close-up view of the tow assembly 110. As can be seen in the figure, the tow assembly 110 comprises two tow bars 120 that are pivotably secured to the base frame 100 so that the tow bars can be rotated between a stowed position and an extended position. Two retaining pins 121 may be inserted into ring-shaped ends of the tow bars 120 to lock them into the stowed position. To extend the tow bars, the retaining pins 121 may be removed and the tow bars pivoted into the extended position. In the extended position, the ring-shaped ends of the tow bars 120 align.

Figure 13A:
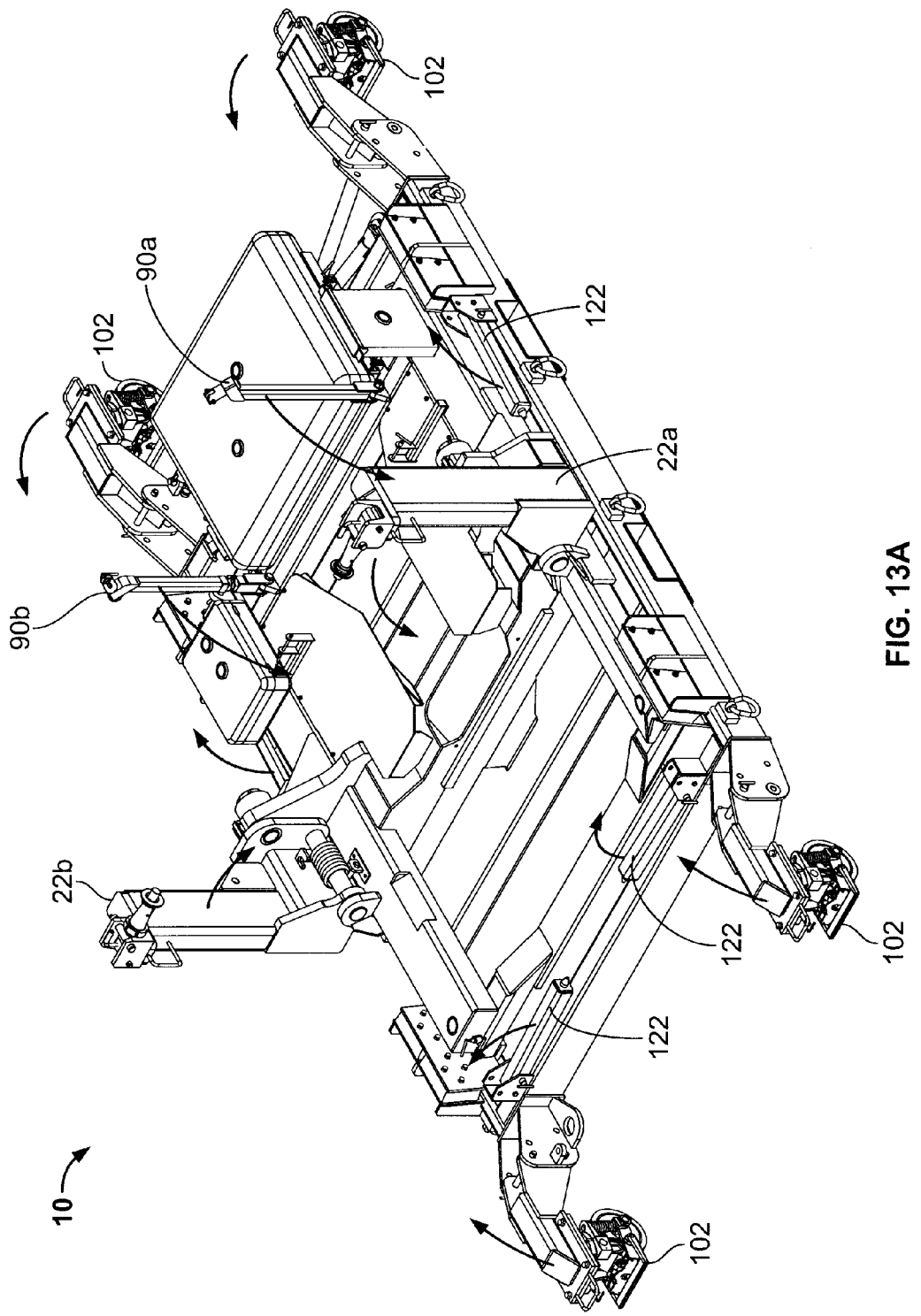
FIG. 13A provides a perspective view the aircraft engine stand of FIG. 1A being converted from an active configuration to a stowed configuration.
Figure 13B:
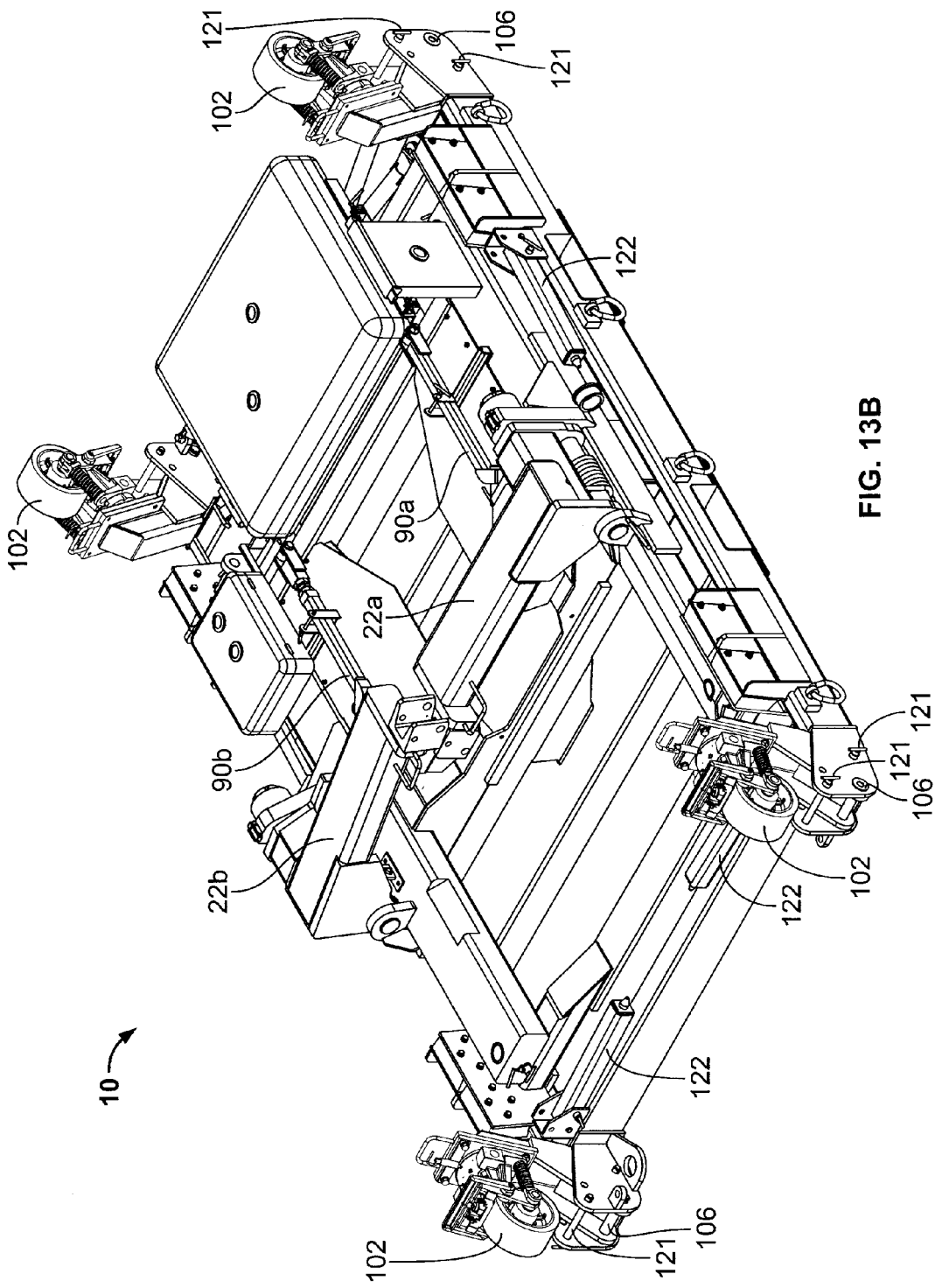
FIG. 13B provides a perspective view of the aircraft engine stand of FIG. 1A in a stowed configuration.
Figure 14:
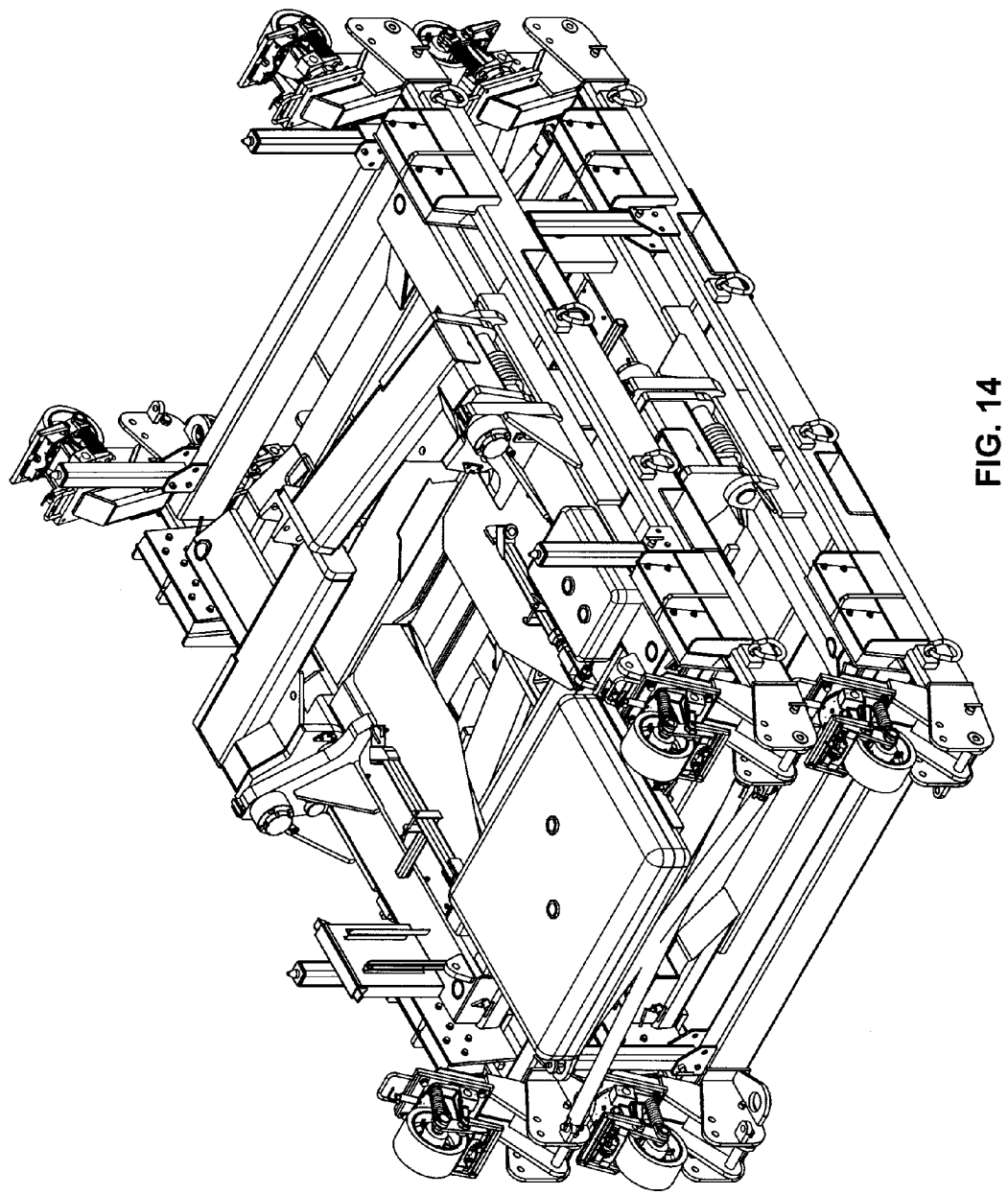
FIG. 14 provides a perspective view of two aircraft engine stands, in accordance with an embodiment of the present invention, in a stacked configuration.

In a preferred embodiment, the aircraft engine stands 10 have a stowed configuration to conserve space when transporting or storing the aircraft engine stands. In furtherance of this goal, the aircraft engine stands 10 may also be stackable when in the stowed configuration. FIG. 13A shows the aircraft engine 10 being converted from an active to a stowed configuration, and FIG. 13B shows the aircraft engine stand 10 in a fully stowed state. All four caster assemblies 102 are pivoted upwards, and the arm assemblies 22a, 22b and the aft supports 90a, 90b are pivoted downward. The four stacking legs 122 are pivoted upwards for stacking aircraft engine stands. FIG. 14 depicts two stowed aircraft engine stands 10 stacked on top of each other. In this configuration, the stacking legs 122 are pivoted upwards to stand vertically. The stacking legs 122 on an aircraft engine stand engage the adjacent aircraft engine stand to secure two stands to each other when in the stacked configuration.

Although the invention has been disclosed with reference only to presently preferred embodiments, those of ordinary skill in the art will appreciate that various modifications can be made without departing from the invention. The specification and figures are, accordingly, to be regarded in an illustrative rather than a restrictive sense. As such, the present invention is defined only by the following claims and recited limitations.

The invention claimed is:
1. An aircraft engine stand comprising:
   a cradle comprising
      a cradle frame having a first frame load transfer opening and a second frame load transfer opening,
      a first arm assembly secured to the cradle frame and having a first arm load transfer opening, and
      a second arm assembly secured to the cradle frame and having a second arm load transfer opening;
   a first load transfer pin shaped to be received in the first frame load transfer opening and the first arm load transfer opening; and
   a second load transfer pin shaped to be received in the second frame load transfer opening and the second arm load transfer opening, wherein
      the first frame load transfer opening is aligned with the first arm load transfer opening to receive the first load transfer pin,
      the second frame load transfer opening is aligned with the second arm load transfer opening to receive the second load transfer pin,
      the first load transfer pin is removably insertable into the first frame load transfer opening and the first arm load transfer opening for transferring loads from the first arm assembly to the cradle frame, and
      the second load transfer pin is removably insertable into the second frame load transfer opening and the second arm load transfer opening for transferring loads from the second arm assembly to the cradle frame.

2. The aircraft engine stand of claim 1, wherein
   the first arm assembly is pivotably secured to the cradle frame, and
   the second arm assembly is pivotably secured to the cradle frame.

3. The aircraft engine stand of claim 2, wherein
   the cradle frame defines a plane, and
   the first arm assembly is pivotable between
      a stowed configuration in which the first arm assembly extends substantially parallel to the plane of the cradle frame so as to allow for stacking of the aircraft engine stand without interference from the first arm assembly, and an upright configuration in which the first arm assembly extends substantially perpendicular to the plane of the cradle frame so as to allow for mounting of an aircraft engine, and the second arm assembly is pivotable between a stowed configuration in which the second arm assembly extends substantially parallel to the plane of the cradle frame so as to allow for stacking of the aircraft engine stand without interference from the second arm assembly, and an upright configuration in which the second arm assembly extends substantially perpendicular to the plane of the cradle frame so as to allow for mounting of an aircraft engine.

4. The aircraft engine stand of claim 3, wherein:
the first arm load transfer opening aligns with the first frame load transfer opening when the first arm assembly is in the upright configuration, and
the second arm load transfer opening aligns with the second frame load transfer opening when the second arm assembly is in the upright configuration.

5. The aircraft engine stand of claim 3, wherein the cradle further comprises
a first torsion spring secured to the cradle frame for at least partially counterbalancing the first arm assembly, and
a second torsion spring secured to the cradle frame for at least partially counterbalancing the second arm assembly.

6. The aircraft engine stand of claim 5, wherein rotation of each of the first and second arm assemblies requires less than 75 pounds of force.

7. The aircraft engine stand of claim 6, wherein rotation of each of the first and second arm assemblies requires less than 50 pounds of force.

8. The aircraft engine stand of claim 1 wherein
the first arm assembly further comprises: a first mount retaining saddle having a first retainer pin,
the second arm assembly further comprises: a second mount retaining saddle having a second retainer pin, and
the aircraft engine stand further comprises:
a first engine mount shaft mounted in the first mount retaining saddle, and
a second engine mount shaft mounted in the second mount retaining saddle, wherein
the first engine mount shaft comprises:
an interior end,
an exterior step positioned along a top surface of the first engine mount shaft opposite the interior end, engaging the first retainer pin, and
a curved chamfer positioned along a bottom surface of the first engine mount shaft directly beneath the exterior step, the curved chamfer allowing the first engine mount shaft to rotate about the first retainer pin within the first mount retaining saddle, and
the second engine mount shaft comprises:
an interior end,
an exterior step positioned along a top surface of the second engine mount shaft opposite the interior end, engaging the second retainer pin, and
a curved chamfer positioned along a bottom surface of the second engine mount shaft directly beneath the exterior step, the curved chamfer allowing the second engine mount shaft to rotate about the second retainer pin within the second mount retaining saddle.

9. The aircraft engine stand of claim 1, further comprising a transport base for receiving the cradle, the transport base comprising:
a base frame; and
a plurality of caster assemblies pivotably secured to the base frame such that each of the plurality of caster assemblies may be pivoted between a stowed configuration and an active configuration.

10. The aircraft engine stand of claim 9, wherein
the aircraft engine stand has a stowed configuration in which the first arm assembly, the second arm assembly and the plurality of caster assemblies are in their respective stowed configurations, and
when the aircraft engine stand is placed in the stowed configuration, it is stackable with other similarly configured aircraft engine stands.

11. An aircraft engine stand comprising: a cradle comprising:
a cradle frame defining a plane and having a first frame load transfer opening and a second frame load transfer opening,
a first arm assembly, having a first arm load transfer opening, pivotably secured to the cradle frame and pivotable between a stowed configuration in which in which the first arm assembly extends substantially parallel to the plane of the cradle frame so as to allow for stacking of the aircraft engine stand without interference from the first arm assembly, and an upright configuration in which the first arm assembly extends substantially perpendicular to the plane of the cradle frame so as to allow for mounting of an aircraft engine,
a second arm assembly, having a second arm load transfer opening, pivotably secured to the cradle frame and pivotable between a stowed configuration in which in which the second arm assembly extends substantially parallel to the plane of the cradle frame so as to allow for stacking of the aircraft engine stand without interference from the second arm assembly, and an upright configuration in which the second arm assembly extends substantially perpendicular to the plane of the cradle frame so as to allow for mounting of an aircraft engine,
a first mount retaining saddle positioned on the first arm assembly, and a second mount retaining saddle positioned on the second arm assembly; a first engine mount shaft mounted in the first mount retaining saddle;
a second engine mount shaft mounted in the second mount retaining saddle;
a first load transfer pin shaped to be received in the first frame load transfer opening and the first arm load transfer opening;
a second load transfer pin shaped to be received in the second frame load transfer opening and the second arm load transfer opening, wherein the first frame load transfer opening is aligned with the first arm load transfer opening to receive the first load transfer pin when the first arm assembly is in the upright configuration, and
the second frame load transfer opening is aligned with the second arm load transfer opening to receive the second load transfer pin when the second arm assembly is in the upright configuration.

12. The aircraft engine stand of claim 11, wherein the first engine mount shaft comprises:
  an interior end, an exterior step positioned along a top surface of the first engine mount shaft opposite the interior end, the exterior step engaging a first retainer pin within the first mount retaining saddle, and
  a curved chamfer positioned along a bottom surface of the first engine mount shaft directly beneath the exterior step, the curved chamfer allowing the first engine mount shaft to rotate about the first retainer pin, and the second engine mount shaft comprises:
  an interior end, an exterior step positioned along a top surface of the second engine mount shaft opposite the interior end, the exterior step engaging a second retainer pin within the second mount retaining saddle, and
  a curved chamfer positioned along a bottom surface of the second engine mount shaft directly beneath the exterior step, the curved chamfer allowing the second engine mount shaft to rotate about the second retainer pin.

13. The aircraft engine stand of claim 11, further comprising:
  a first torsion spring secured to the cradle frame for at least partially counterbalancing the first arm assembly, and
  a second torsion spring secured to the cradle frame for at least partially counterbalancing the second arm assembly.

14. The aircraft engine stand of claim 13, wherein rotation of each of the first and second arm assemblies requires less than 75 pounds of force.

15. The aircraft engine stand of claim 14, wherein rotation of each of the first and second arm assemblies requires less than 50 pounds of force.

16. The aircraft engine stand of claim 11 further comprising a transport base for receiving and securing the cradle, the transport base comprising
  a base frame; and
  a plurality of caster assemblies pivotably secured to the base frame such that each of the plurality of caster assemblies may be pivoted between a stowed configuration and an active configuration.

17. The aircraft engine stand of claim 16, wherein the aircraft engine stand has a stowed configuration in which the first arm assembly, the second arm assembly, and the plurality of caster assemblies are in their respective stowed configurations,
  and further wherein, when the aircraft engine stand is placed in the stowed configuration, it is stackable with other similarly configured aircraft engine stands.

* * * * *